A. KISS.
CAMERA.
APPLICATION FILED JUNE 23, 1916.
1,218,273.
Patented Mar. 6, 1917.
2 SHEETS—SHEET 2.
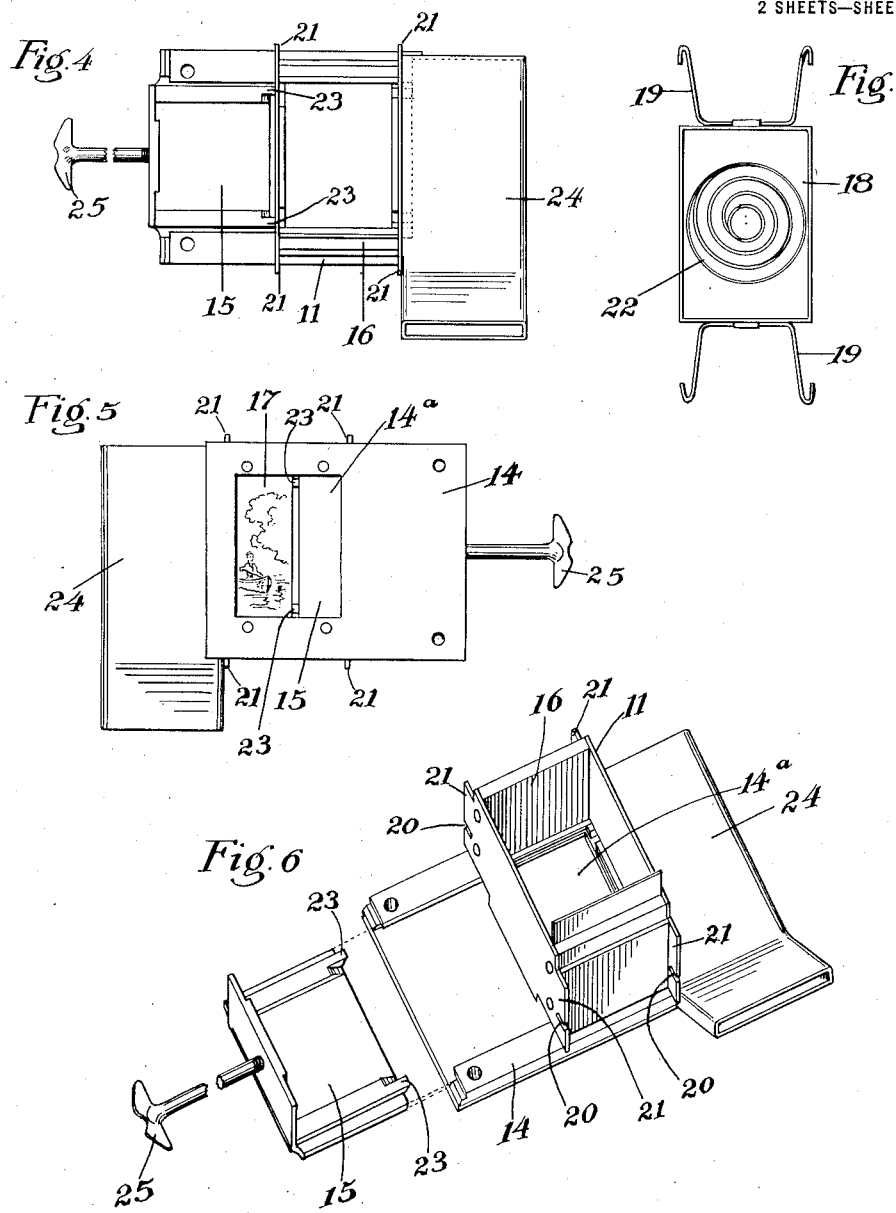
Inventor
Andreas Kiss

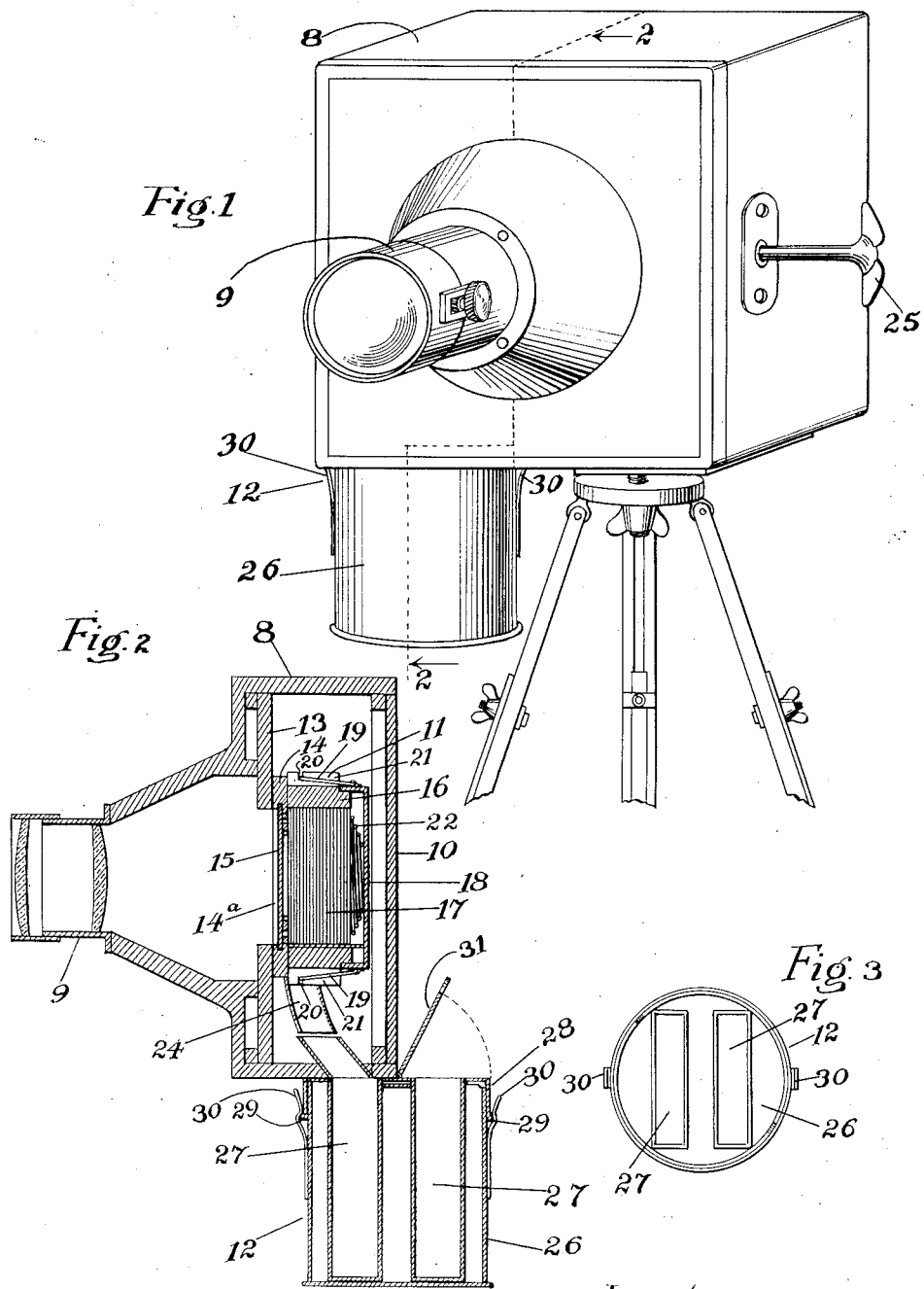

UNITED STATES PATENT OFFICE.

ANDREÁS KISS, OF CINCINNATI, OHIO, ASSIGNOR OF ONE-HALF TO MARTIN RUSZ, OF CINCINNATI, OHIO.

CAMERA.

1,218,273.  Specification of Letters Patent.  Patented Mar. 6, 1917.

Application filed June 23, 1916. Serial No. 105,502.

*To all whom it may concern:*

Be it known that I, ANDREÁS KISS, a subject of the Emperor of Austria-Hungary, residing at Cincinnati, in the county of Hamilton and State of Ohio, have invented certain new and useful Improvements in Cameras, of which the following is a description, reference being had to the accompanying drawings, forming a part thereof.

My invention relates to an improved camera and particularly to that type of camera designed to take and develop pictures directly on sensitized cards, tin types and the like without necessitating their removal from the camera from the time the sensitized card or tin type is placed therein to the time it is removed therefrom as a finished picture.

An object of my invention is to produce a camera of the above described type in which a pack of sensitized cards or tin types may be placed in the camera, then exposed successively and automatically developed after each exposure.

A further object is to produce a camera of the above described type in which each one of the pack of cards or tin types, after having been exposed, is immersed successively in a developing bath where it remains until the entire pack has been immersed, at which time it is removed from the camera as a pack of finished pictures.

In the drawings Figure 1 is a perspective view of a camera embodying my invention.

Fig. 2 is a transverse sectional view taken on the line 2—2 of Fig. 1.

Fig. 3 is a plan view of the interior of a card or plate receiving and developing tank embodying a detail of my invention.

Fig. 4 is a detail back view of the pack holder, the shutter and the delivery chute.

Fig. 5 is a detail front view of the pack holder, the delivery chute and the shutter partially closed and in the act of discharging an exposed card or tin type to the chute.

Fig. 6 is a perspective view of the pack holder, the shutter and the delivery chute disclosed in Figs. 4 and 5.

Fig. 7 is a front view of the pack retainer and the yielding means employed for forcing the cards or plates of the pack into position as they are used up and delivered to the developing tank.

The camera embodying my invention consists of a body 8 having a lens tube 9 extending from the front thereof and a removable back 10, with a pack holder 11 located within the body 8 and a developing tank 12 located beneath the body in position to receive the cards or plates from the holder 11.

The body 8 is of the usual construction, as is also the lens tube 9 secured to the front thereof, but secured to a partition 13 located within the body, is a frame 14 having a shutter 15 reciprocally mounted therein. Secured to the back of the shutter frame 14 is a frame 16 adapted to contain the card or plate pack 17. Back of the pack 17 is located a cover 18 having hooked catches 19 adapted to engage notches 20 in extensions 21 of the pack frame to retain it in position after the pack is placed in its frame. Cover 18 is provided with a coiled spring 22 adapted to engage the back of the pack to force it forward as each card or plate is exposed and delivered to the developing tank 12.

For the purpose of removing each card or plate from the pack after it has been exposed I provide the shutter with fingers 23 which engage the edge of each card or plate, remove it transversely from the remainder of the pack and place it in a chute 24 through which it falls into the developing tank. A handle 25 is provided for operating the shutter.

The developing tank 12 into which the exposed cards or plates fall, consists of a receptacle 26 preferably of metal and containing two tanks 27 adapted to contain the developing solution. This receptacle is secured to the under side of the body 8 by means of a flanged metal cover 28 secured to the body in any suitable manner and provided with a head 29 at its edge for coöperation with spring clips 30 on the receptacle 26 to retain the tank in position. The position of the cover 28 is such that each tank 27 may register with the chute 24, an opening in the cover and body 8 permitting the cards or plates to drop into the tanks. When one tank 27 is in register with the chute 24, the other tank is in the position shown in Fig. 2, a lid 31 being provided on the cover 28 to render its interior accessible.

In operating my improved camera, the shutter is moved to its closed position to close the opening 14ᵃ in the shutter frame 14, the back 10 and cover 18 are removed from the pack holder frame 16, a pack of sensitized cards or tin types is placed in the frame 16 and the cover 18 is replaced in the position shown in Fig. 2, the spring 22 being compressed in this position. The tanks 27 are filled with developing solution and the receptacle 26 locked in position, with one of the tanks 27 beneath the chute 24. The taking of pictures now proceeds by withdrawing the shutter and exposing the card or plate for the proper length of time, after which the shutter is closed. In its closing operation its fingers 23 engage the edge of the exposed card or plate and force it into the chute 24 through which it drops into the tank 27. The shutter is again in its closed position and ready for a repetition of the above described operation. Each operation discharges a card or plate from the pack until the entire pack is located in the developing tank 27, at which time the tank is rotated to bring it beneath the lid 31 with the fresh tank in position beneath the chute. The developed cards or plates may now be removed by lifting the lid 31, and a fresh pack placed in the pack holder frame 16 in the above described manner.

Having thus described my invention what I claim is—

1. A camera comprising a body, a lens secured to the body, a shutter, a card pack holder located back of the shutter, a developing tank located adjacent to the pack holder, said shutter when withdrawn being adapted to expose the foremost card of the pack and to remove the exposed card from the pack and to permit it to drop into the developing tank when moved to its closed position, and means for maintaining the cards in position to be engaged by said shutter, said means consisting of a plate, a spring mounted on the plate, and hooks adapted to secure the plate to the holder, whereby the spring is maintained in normal engagement with the cards.

2. In a camera the combination of a body, a lens secured to the body, a shutter frame located in the body, a shutter reciprocally mounted therein, a card pack holder located adjacent to the shutter frame and adapted to receive a card pack, a spring adapted to advance the cards of a pack located in the holder, toward the shutter as the cards are removed from the pack after exposure thereof, said shutter being adapted to remove exposed cards from the pack upon each closure thereof, a developing tank located adjacent to the pack holder adapted to receive exposed cards discharged therefrom, a plate adapted to mount the spring, and a hook adapted to maintain the plate in engagement with the holder.

3. In combination in a camera, a body, a lens secured to the body, a shutter, a card pack holder located back of the shutter, a developing tank located adjacent to the pack holder, a chute adapted to direct cards from the holder to the tank, said shutter when opened being adapted to expose the foremost card of the pack and when moved to its closed position to remove the exposed card from the pack and deliver it to the chute, whereby it may drop into the developing tank, said tank having compartments adapted to receive separate packs of exposed cards and adapted to be moved to bring filled compartments into positions to render their contents accessible and empty compartments into position beneath the chute to receive exposed cards therefrom, and means for forcing the cards in said holder into position to be engaged by said shutter, said means consisting of a spring, a plate adapted to mount the spring, and hooks adapted to maintain the plate in engagement with the holder, whereby the spring will be maintained in engagement with the cards in the holder.

In testimony whereof I affix my signature in the presence of two witnesses.

ANDREÁS KISS. [L. S.]

Witnesses:
ROBERT L. SCHULTZ,
C. M. BECHTEL.